United States Patent [19]
Stachurski

[11] 3,899,359
[45] Aug. 12, 1975

[54] THERMOELECTRIC GENERATOR

[76] Inventor: John Z. O. Stachurski, 1684 W. 10th St., Brooklyn, N.Y. 11223

[22] Filed: Apr. 12, 1973

[21] Appl. No.: 350,407

Related U.S. Application Data

[63] Continuation-in-part of Ser. No. 53,168, July 8, 1970, abandoned.

[52] U.S. Cl. ................. 136/205; 136/212; 136/218
[51] Int. Cl.² ........................................ H01L 35/32
[58] Field of Search ............ 136/204, 205, 208–212, 136/217, 218, 230; 62/3; 165/166

[56] References Cited
UNITED STATES PATENTS

| | | | |
|---|---|---|---|
| 2,675,417 | 4/1954 | Heibel | 136/209 |
| 3,116,167 | 12/1963 | Talaat | 136/210 |
| 3,356,539 | 12/1967 | Stachurski | 136/205 |
| 3,552,133 | 1/1971 | Lukomsky | 62/3 |
| 3,559,728 | 2/1971 | Lyman et al. | 165/166 |
| 3,632,451 | 1/1972 | Abbott | 136/212 |

*Primary Examiner*—Verlin R. Pendegrass
*Attorney, Agent, or Firm*—St. Onge Mayers Steward & Reens

[57] ABSTRACT

A thermoelectric generator is described with an efficiency of heat to electricity conversion higher than the maximum efficiency as defined by the theory applicable to a simple thermocouple. The generator represents an overall counterflow heat exchange containing thermocouples as its integral part. The energy conversion is maximized when certain structural relationships are fulfilled. The thermocouples are subdivided into segments which are oriented so that overall temperature drop in the heat exchanger and temperature drops in the segments are parallel. To allow for delivery of hot and cold fluids at the rates necessary for actual operation of the generator and simultaneously to minimize heat flow from the hot end to the cold end of the generator, thermoelectricity generating functions and heat exchanging functions are separated and stratified. Number of metallic heat exchangers are placed in places perpendicular to the overall heat drop in the generator to allow heat exchange between the heating and cooling fluids.

27 Claims, 15 Drawing Figures

THERMOELECTRIC GENERATOR

This application is a continuation-in-part of a patent application for a Thermoelectric Generator filed by John Z. O. Starchurski on July 8, 1970 bearing Ser. No. 53,168 and now abandoned.

This invention relates to a method and apparatus for directly converting heat to electricity with thermoelectric elements such as thermocouples and the like.

In a thermoelectric generator a plurality of thermoelectric elements are electrically connected to each other and selectively heated and cooled to provide dc electricity in accordance with the well-known Seebeck effect. Thermoelectric elements are formed of dissimilar materials which are characterized by either positive (p) or negative (n) values of differential Seebeck coefficients.

In a thermoelectric generator made in accordance with the invention thermoelectric elements are selectively distributed through a heat exchanger. The heat exchanger is provided with overall counter-flowing heated and cool fluid streams which exchange heat between them in an efficient direct manner to produce a temperature difference across the heat exchanger. The heat in the heated fluid stream is gradually and efficiently transferred to the cool fluid stream as the two streams are arranged in close heat exchange relationship through a number of passes in the heat exchanger, with respective passes at different temperatures. The thermoelectric elements have opposite sides exposed in high heat conductive relationship with respective ones of said passes which differentially heat the thermoelectric elements to produce electricity. The high efficiency is realized with the use of a counter-flow heat exchanger wherein the heat flow from the hot end of the heat exchanger to its cold end is very low in comparison with the transfer of heat between the counterflowing streams.

The efficiency of the thermoelectric generator in accordance with the invention may be appreciated in view of the following analysis.

In a conventional thermocouple, the heat delivered to the thermocouple by the heating gas ($Q_g$) is approximately equal to the heat lost ($Q_{lost}$) by diffusing through the thermocouple without being converted to electricity. Thus:

$$(1) \quad Q_{lost} \cong Q_g = K \frac{A}{L} \Delta T$$

where
K is the thermal conductivity in thermocouple materials both for p and n materials ($K_p = K_n$)
A is the crossectional area for both p and n materials ($A_p = A_n$)
L is the length of a leg ($L_p = L_n$)
$\Delta T$ is the temperature difference between the hot end and the cold end of the thermocouple.

In a thermoelectric generator in accordance with the invention
$Q_g$ is the heat delivered to the thermocouple by the hot gas at the hot end and flowing towards the cold end.
$Q_a$ is the heat absorbed by the cold air entering at the cool end and flowing towards the hot end of the thermocouple.
$Q'_{lost}$ is heat which has not been absorbed by the counterflowing stream of cold air due to imperfection of the heat exchange. Accordingly, for the thermoelectric generator in accordance with the invention:

$$(2) \quad Q'_{lost} = Q_g - Q_a = K' \frac{A}{L} \Delta T$$

The efficiency, $\eta_{ex}$, for a heat exchanger is by definition:

$$(3) \quad \eta_{ex} = \frac{Q_a}{Q_g}$$

Substituting for $Q_a$ from equation (2) in (3) yields:

$$(4) \quad \eta_{ex} = \frac{Q_g - Q'_{lost}}{Q_g} = 1 - \frac{Q'_{lost}}{Q_g}$$

Hence, $$(5) \quad Q'_{lost} = Q_g (1 - \eta_{ex}) = K' \frac{A}{L} \Delta T$$

where K' represents a pseudo heat transfer coefficient resulting from the fact that the heat exchanging thermocouple in this invention is treated the same way as any piece of material exposed to $\Delta T$.

Dividing equation (5) by (1) to compare the heat losses in a conventional thermoelectric generator with those in a thermoelectric generator in accordance with the invention yields:

$$(6) \quad \frac{Q_g (1 - \eta_{ex})}{Q_g} = \frac{K' \frac{A}{L} \Delta T}{K \frac{A}{L} \Delta T}$$

which reduces to:

$$(7) \quad K' = K (1 - \eta_{ex})$$

In the art of thermocouples, a figure of merit is employed to evaluate their performance. This figure of merit, $Z_{np}$, is a function of specific resistivities, $\Gamma_p$ and $\Gamma_n$; thermal conductivities $K_p$, $K_n$; and the thermoelectric coefficient, $\alpha_{np}$. This figure of merit is:

$$(8) \quad Z_{np} = \frac{\alpha_{np}^2}{[(\Gamma_n K_n)^{1/2} + (\Gamma_p K_p)^{1/2}]^2}$$

Substituting K' in the figure of merit yields:

$$(9) \quad Z'_{np} = \frac{\alpha_{np}^2}{[(\Gamma_n K'_n)^{1/2} + (\Gamma_p K'_p)^{1/2}]^2}$$

Substituting the value of K' from (7) into the expression (9) a new figure of merit is obtained:

$$(10) \quad Z'_{np} = \frac{\alpha_{np}^2}{[(\Gamma_n K_n (1 - \eta_{ex,n}))^{1/2} + (\Gamma_p K_p (1 - \eta_{ex,p}))^{1/2}]^2}$$

Substituting $Z'_{np}$ for $Z$ in the well-known expression by Ioffe for efficiency of a thermoelectric generator, the efficiency of the thermoelectric generator of this invention may be expressed as the efficiency of the heat exchange, $\eta_{ex}$:

$$\eta_{tg} = \frac{\Delta T}{T_h} \cdot \frac{(1+\bar{T}Z'_{np})^{1/2} - 1}{[(1+\bar{T}Z'_{np})^{1/2} + \frac{T_c}{T_h}]}$$

where $$\bar{T} = \frac{(T_h + T_c)}{2}$$

$T_h$ = temperature of the hot end of the thermoelectric generator.
$T_c$ = temperature of the cold end of the thermoelectric generator.
$\eta_{tg}$ = efficiency of the thermoelectric generator.

Since, according to the expression (10) $Z'_{np}$ approaches infinity as $\eta_{ex}$ approaches unity: The limit of $\eta_{tg}$ as $\eta_{ex}$ approaches infinity is $$\eta_{tg} = \frac{\Delta T}{T_h} = \text{Carnot}$$

or the highest attainable efficiency for a thermal engine.

Consequently, the efficiency of a thermoelectric generator in accordance with the invention can approach the highest possible, Carnot, efficiency for a thermal engine by making the efficiency of the heat exchange within the thermoelectric generator between the heated and cool fluid streams high.

The prior art thermoelectric generators, however, depend primarily upon the properties of the thermoelectric materials to achieve efficiencies which, at best, are but a fraction of the Carnot cycle efficiency.

In known prior art thermoelectric generators the thermoelectric elements are differentially heated by passing a hot fluid stream on the opposite side. The exchange of heat between the fluid streams depends upon the conductivity of the thermoelectric elements located between the heated and cool fluid streams.

An important and highly advantageous distinguishing feature of a thermoelectric generator in accordance with the invention resides in that the exchange of heat between the fluid streams across the thermoelectric elements has been substantially replaced with a direct heat exchange between the streams to produce a temperature difference across a heat exchanger. The term direct is used herein to denote the exchange of heat between the heated and cool fluid streams and means the highly efficient heat transfer from the heated fluid stream through a thin high heat conductive wall to a cool fluid stream. The term direct heat exchange also includes the heat exchange that arises when heated and cool fluid streams are alternatively driven through a common passage such as encountered with periodic heat exchangers. The heat transfer from the heated stream to the cool fluid stream is obtained with high efficiency so that the heat in the heated fluid stream is preserved by its gradual transfer to the cool fluid stream.

The thermoelectric elements in a thermoelectric generator made in accordance with the invention are placed in high heat conducting relationship with pairs of such direct heat exchanging heated and cool fluid streams. The opposite sides of thermoelectric elements are thus maintained at different temperatures in accordance with the temperature differentials produced by pairs of direct heat exchanging heated and cool fluid streams.

In U.S. Pat. No. 3,356,539 by John Z. O. Stachurski, a thermoelectric generator is described wherein heated and cool fluid streams pass generally counter-flow heat exchanging relationship through passages adjacent thermoelectric elements. The thermoelectric elements are subjected to temperature differences at incremental points along the length of the elements.

In a specific embodiment of a thermoelectric generator in accordance with the invention a plurality of electricity producing thermoelectric elements are selectively electrically connected throughout their distributing positions in a heat exchanger formed of overall counter-flowing heated and cool direct heat exchanging fluid streams to form an electricity generator of significant voltage. A number of thermoelectric heat exchanger sections are formed and placed in electrical connection to produce a generator voltage. Each sectional generator is formed of multiple passes of overall counter-flowing streams of direct heat exchanging heated and cool fluids. Thermoelectric elements are selectively placed between the passes with opposite sides in high heat conducting relationship with respective ones of the passes. Cool fluid is passed into one end of the heat exchange section and passed back and forth through cooling passages to be discharged at a substantially higher temperature at a heating source. The discharged cool fluid is heated by the source to a higher temperature sufficient for a return to the heat exchanger section as a heated fluid stream. The heated fluid is passed back and forth through heating passages located in direct heat exchange relationship with the cool fluid. The heat energy of the heated fluid stream is gradually transferred to the cool fluid stream to thus produce a temperature differential between the ends of the heat exchanger section. The direct heat exchanging streams form passes which are serially coupled to each other along the heat exchanger. Each pass is characterized by an average temperature which differs from an adjacent pass. Thermoelectric elements are placed between adjacent passes of direct heat exchanging heated and cool fluid streams so as to be differentially heated thereby in correspondence with respective temperature differentials of the passes. The thermoelectric elements are electrically connected to form a substantial voltage with each thermoelectric generator section. Several sections are combined to form electrically higher generator power.

An advantage of the thermoelectric generator of this invention resides in the efficient utilization of the heat energy. A substantial used portion of the heat transferred to the incoming cool fluid stream is directed back to the heating source. The cool fluid is raised in temperature as it reaches the heating source which imparts sufficient heat to the cool fluid to raise its temperature to a level for return through the heat exchanger as a heated fluid stream.

In one embodiment of a thermoelectric generator of this invention a plurality of heat exchanging elements are advantageously employed to serve as current collectors as well as provide a high heat conductive path between the heated and cool fluid streams for improved temperature distribution. The heat exchange elements further provide a high heat conductive path directly to the individual thermoelectric elements, so that the temperature differences produced by the counter-flowing direct heat exchanging fluid stream passes is efficiently applied across the thermoelectric elements.

A thermoelectric generator of this invention provides a highly efficient direct conversion of heat to electricity. A multiple of heat exchanger sectional generators are operatively combined to form a compact efficient primary electric power plant.

Thermoelectric generators generally exhibit practical conversion (heat to electricity) efficiencies measured in the order of percentile points. A thermoelectric generator of this invention is characterized by conversions efficiencies measured in the order of tens of percentile points with higher efficiencies being practically realizable.

The effect of directly converting heat to electricity with high efficiency expands the utility of the thermoelectric generators made in accordance with the invention to a large variety of applications. Primary electrical power for automotive purposes may be produced with low pollution products by utilizing efficient heat sources. A thermoelectric generator of this invention may thus be advantageously employed as an electrical power source for a large variety of applications including automotive.

The energy conversion is maximized when certain structural relationships are fulfilled. The thermocouples are subdivided into segments which are oriented so that overall temperature drop in the heat exchanger and temperature drops in the segments are parallel.

As described hereinafter with respect to a specific embodiment for a self contained theremoelectric generator in accordance with the invention, a heating source is described in the form of a burner of fossil fuel such as gasoline or natural gas. The air for this burner is drawn through the cool fluid heat exchanging passages in the generator sections. As the fuel is burned, the hot combustion gases are exhausted through the heated fluid heat exchanging passages where their heat is transferred to the incoming flow of cooler air. As a result, preheated gases are supplied to the burner for enhanced fuel combustion efficiency. The fuel burning is a continuous process at a rate corresponding to the desired electrical load on the generator.

It is, therefore, an object of this invention to provide a thermoelectric generator of high efficiency. It is a further object of this invention to provide a thermoelectric generator of compact structure with great utility.

Other advantages and objects of a thermoelectric generator in accordance with the invention may be understood from the following description of several embodiments in conjunction with the drawings wherein.

With reference to FIGS. 1 through 5 a heat exchanging thermoelectric generator section 20 is shown. The section is provided with a multiple of pairs of overall counterflowing direct heat exchanging heated and cool fluid stream passes 22. Each pass 22 is formed of a heated fluid stream as indicated by dashed arrows 24 and a cool fluid stream represented by solid arrows 26. As will be further explained a number of these sections may be combined into an efficient primary electrical power plant.

The heated fluid stream 24 enters the generator section 20 from the right on the drawing into heated fluid inlet ports 28 and is discharged from a heated fluid outlet port 30 at the bottom left of the drawing. The cool fluid stream 26, which may for instance be air at generally ambient temperature, enters at an inlet port 32 and is discharged at substantially elevated temperature from an outlet port 34 adjacent a heat source 36 (not shown in FIG. 1, see FIGS. 6 through 8).

The heated and cool fluid streams 24–26 are in highly efficient direct heat exchanging relationship by means of thin high heat conducting metallic walls such as 38. This direct heat exchange is represented by the short transverse arrows such as 40 which indicate the major heat exchange flow in each of the passes 22.

Figures 1, 11:
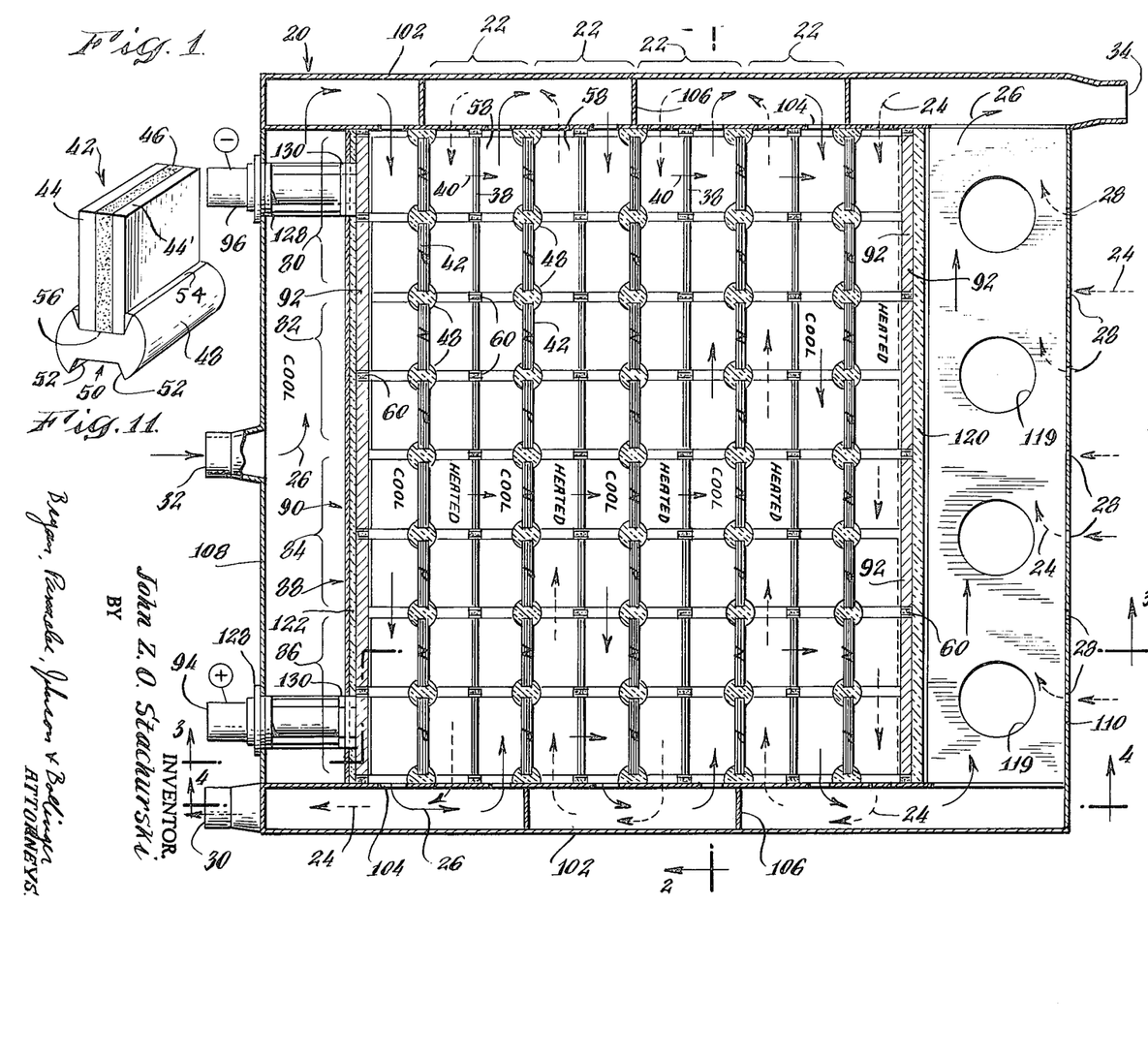
FIG. 1 is a horizontal sectional view of a heat exchanging thermoelectric generator section in accordance with the invention.
FIG. 11 is a perspective enlarged view of a thermoelectric element and an electrical insulator used to hold the element in place.
Figure 2:
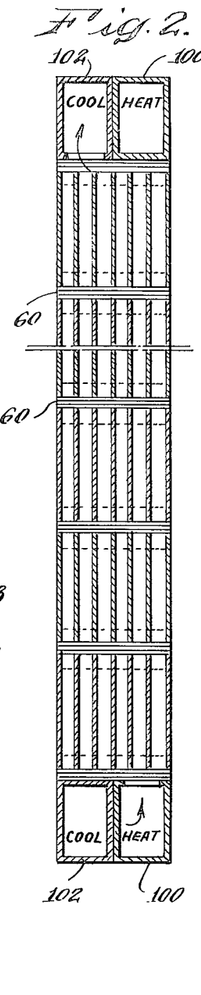
FIG. 2 is a broken vertical sectional view of the thermoelectric generator of FIG. 1 taken along the line 2—2 in FIG. 1.

Between passes 22, thermoelectric elements 42 are placed. Each element is formed as shown in FIG. 11 of a sandwich structure of outer metallic layers 44–44', such as made of iron, with a semiconductor layer 46 placed therebetween. The semiconductor layer 46 is made of a material characterized by a good Seebeck coefficient, for instance lead telluride or germanium silicon alloy. The semiconductor layers are properly doped to provide both P and N thermoelectric materials. The semiconductor layer 46 is sintered under pressure to the iron layers 44–44' to form low electrical resistance contact therewith. The method of selecting the materials and formation of the sandwich structure are known in the art and further description is not necessary.

Each thermoelectric element 42 is retained by a pair of electric insulators 48 having longitudinal slots 50 sized to receive an edge of the sandwiched structure 42 as illustrated in greater detail in FIG. 11. The sides 52 of the slots 50 are chamfered as shown and provided with a brazing compound 54. The bottom 56 of the slot 50 is clear to avoid electrical shorting between layers 44–44'.

Figures 5, 8:
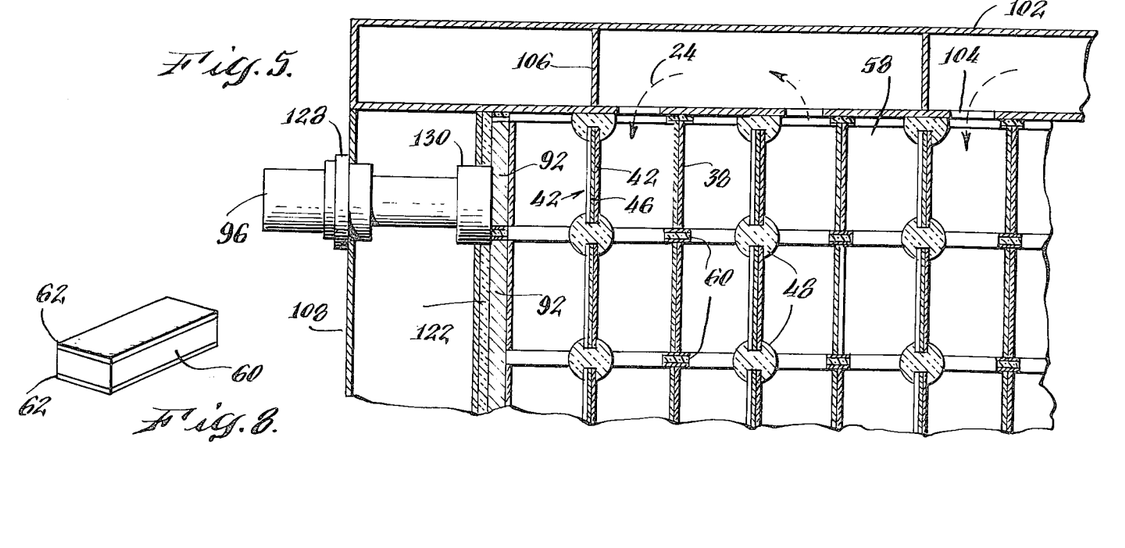
FIG. 5 is an enlarged partial horizontal sectional view of the thermoelectric generator of FIG. 1.
FIG. 8 is a perspective view of an electrical insulator used to space heat exchanger elements employed in the thermoelectric genertor of FIG. 1.

The passes 22 are formed of a plurality of spaced heat exchange elements 58 formed in a corrugated shape to define a multiple of parallel aligned passages. The heat exchange elements such as 58 are spaced from each other by electrical insulators such as 60, which also serve to prevent mixing of the heated and cool fluid streams 24–26. FIG. 8 illustrates an insulator 60 in a rectangular shape. Brazing compound layers 62 are provided for brazing engagement with the heat exchange elements 58.

Figure 3:
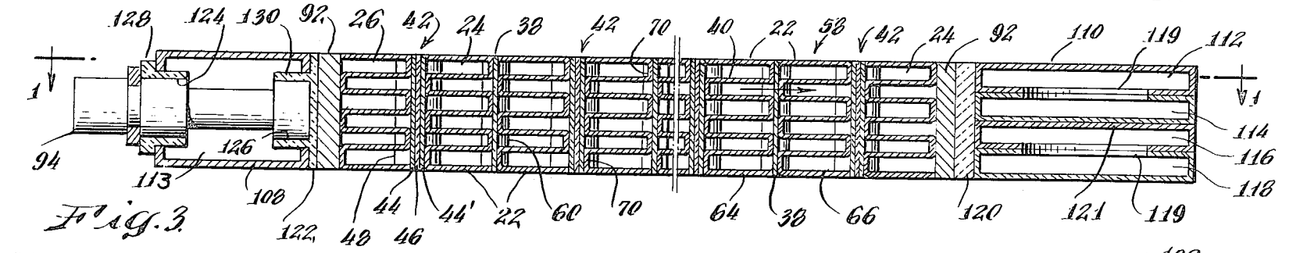
FIG. 3 is a broken vertical sectional view of the thermoelectric generator of FIG. 1 taken along the line 3—3 in FIG. 1.
Figure 4:
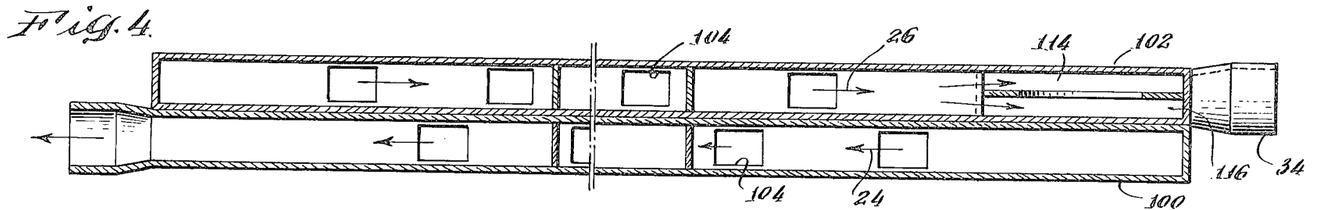
FIG. 4 is a broken vertical sectional view of the thermoelectric generator section of FIG. 1 taken along the line 4—4 in FIG. 1.

The sectional view of FIG. 3 illustrates the heat exchange elements 58, which are formed of pairs of electrically conductive and high heat conductive corrugated fin segments 64–66. Fin segments 64–66 are joined to each other by conductive wall 38, which is sized and shaped to physically isolate the heated and cool fluid streams 24–26 and still provide a high heat conductive path between the fluid streams. The convolutions, such as 70, are alternately brazed at their outer ends to a wall 38 and a layer 44 or 44' of a thermoelectric element 42 to form parallel passages for the fluid streams 24–26. The heat exchange segments 64–66 are made of a material whose thickness is selected to provide low electrical resistance and high heat conductivity.

Figure 9:
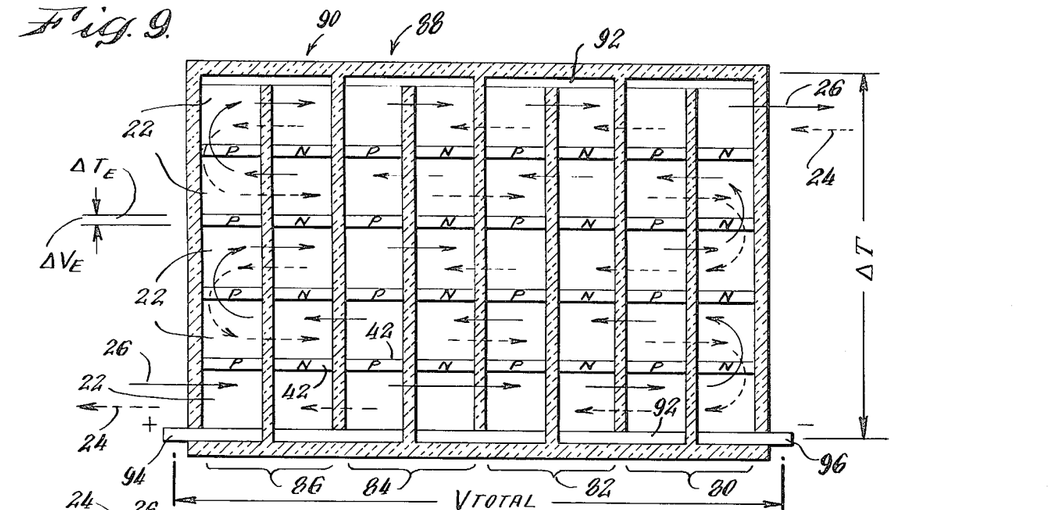
FIG. 9 is a simplified schematic representation of the thermoelectric generator section shown in FIG. 1.

FIG. 9 illustrates a schematic representation of the heat exchanger thermoelectric generator section 20 of FIG. 1. Four complete thermocouples 80, 82, 84 and 86 are connected in series to form a thermoelectric generator. Each thermocouple is formed of a pair of legs such as 88–90 composed of P and N type thermoelectric elements 42 respectively.

The generator section is shown provided with five serially coupled passes 22 of overall counterflowing heated and cool fluid streams 24–26. As the streams are conducted in direct heat exchanging relationship with each other along the several passes 22 an overall temperature drop, $\Delta T$, is developed across the entire generator section 20. With the thermoelectric elements distributed as shown between the passes 22 each element 42 is subjected to a portion, $\Delta T_E$ of the overall temperature difference $\Delta T$. In correspondence with each portional temperature difference $\Delta T_E$ an incremental voltage $\Delta V_E$ is produced. The incremental voltages add with one another across each thermocouple. The individual thermocouples are connected in series with electrical connectors such as 92 to produce a generator voltage across positive voltage terminal 94 and negative voltage terminal 96.

An advantage of the thermoelectric generator of FIG. 9 resides in the direct application of the temperature difference across the thermoelectric elements 42 while directing the major heat exchange flow generally transverse and away from the elements by means of the closely coupled direct heat exchanging fluid streams 24–26. Any heat flow that occurs across the thermoelectric elements 42 is returned to the heat exchanger system by the pass 22 at the cooler side of element 42. However, in view of the low heat conductivity across a thermoelectric element 42 in comparison with the heat conductivity across wall 38 (different by a factor of the order of 100) relatively little heat is transferred between streams across thermoelectric elements.

The thermoelectric elements 42 are advantageously coupled in high heat exchange relationship with adjacent passes 22 by brazing the heat exchange elements 58 directly onto the elements 42. Hence the heat in each pass 22 is efficiently applied to each thermoelectric element 42.

Returning to the views related to FIG. 1, the structural features of the thermoelectric generator may be more fully appreciated. The multiple passes 22 are interconnected in series relationship with heated and cool fluid stream manifolds 100–102 respectively. These manifolds are formed of rectangular tubing material with slots such as 104 provided at locations that are in alignment with the several fluid streams to couple the latter in series. Note in this respect that some of the arrows at the manifolds 100–102 also represent stream interconnections below the plane of the drawings as may be appreciated from the view in FIG. 2. Walls such as 106 are placed in the tubing manifolds at suitable staggered locations to isolate the stream passes 22 (see FIG. 4).

The tubular manifolds 100–102 form a rectangular frame with a cool fluid inlet end frame section 108 of rectangular construction, and an end frame section 110. As can be seen in FIG. 3, the cool fluid inlet frame section 108 is formed into a rectangular tubular shape having a single passage 113 communicating with cool fluid inlet port 32 and with the cool fluid manifold 102 at the top of FIG. 1.

The end frame section 110 is formed of four parallel rectangular channel sections having passages 112, 114, 116 and 118. Passages 112 and 114 are in communication with the cool manifold 102 at the bottom of FIG. 2 and the cool fluid outlet port 34 shown at the top of FIG. 1. Passages 116 and 118 are in communication with the heated fluid manifold 100 at the top of FIG. 2.

Heated fluid inlet ports 28 are in communication with passages 116 and 118 to introduce heated fluid. Fluid mixture ports 119 are provided in the walls between passages 112–114 and 116–118. These mixture ports serve to reduce the temperature differences between cool fluid passages 112–114, and heated fluid passages 116–118. It should be understood that the cool fluid stream in end-manifold passages 112–114 is at a substantially elevated temperature. In fact, a heat exchange across wall 121 occurs to reduce the temperature of the heated fluid while increasing the temperature of the cool fluid stream near heat source temperatures. The terms cool and heated reflect relative temperature differences between the direct heat exchanging streams as they are applied to opposite heat exchanger ends for direct heat exchange between one another.

A high temperature insulator 120, such as made of ceramic material, is placed between the end frame section 110 and the electrical connectors 92 at the hot end of the thermoelectric generator section. Insulator 120 provides both electrical insulation of connectors 92 as well as a heat shield to protect thermoelectric elements 42 from direct exposure to the high temperature fluid entering ports 28.

An electrical insulator 122 is located at the cold end of the thermoelectric generator between the electrical connectors 92 and end frame section 108.

Electrical terminals 94–96 are formed of heavy metallic studs which are passed through bores 124–126 in insulator bushings 128–130 respectively. Terminals 94–96 pass through passage 114 in end frame section 108 for brazing contact with electrical connectors 92.

Assembly of the thermoelectric generator section is accomplished within a suitable fixture (not shown) that maintains the several components in their proper position as described. A brazing compound is applied to the joints between thermoelectric elements 42 and heat exchange elements 58 as well as between the manifolds 100–102 and the heat exchange elements 58 and end frame sections 108–110. The joints between electrical connectors 92 and the heat exchange elements 58 are also brazed. The brazing step is carried out at a selected temperature below the melting temperature of the thermoelectric materials 46, but sufficiently high to maintain the integrity of the brazed joints near the hot end of the thermoelectric generator during normal operations.

The completed thermoelectric generator section 20 provides an efficient direct conversion of heat to electricity. The section includes four thermocouples 80, 82, 84 and 86 in series connection. The open circuit voltage developed by the section is of the order of 0.4 volts depending upon the type of thermoelectric materials employed. In the self contained thermoelectric generator 150 depicted in a plan view in FIG. 6 a multiple of generator sections 20 are combined to produce a source of electricity of substantial power and elevated voltage.

Figure 6:
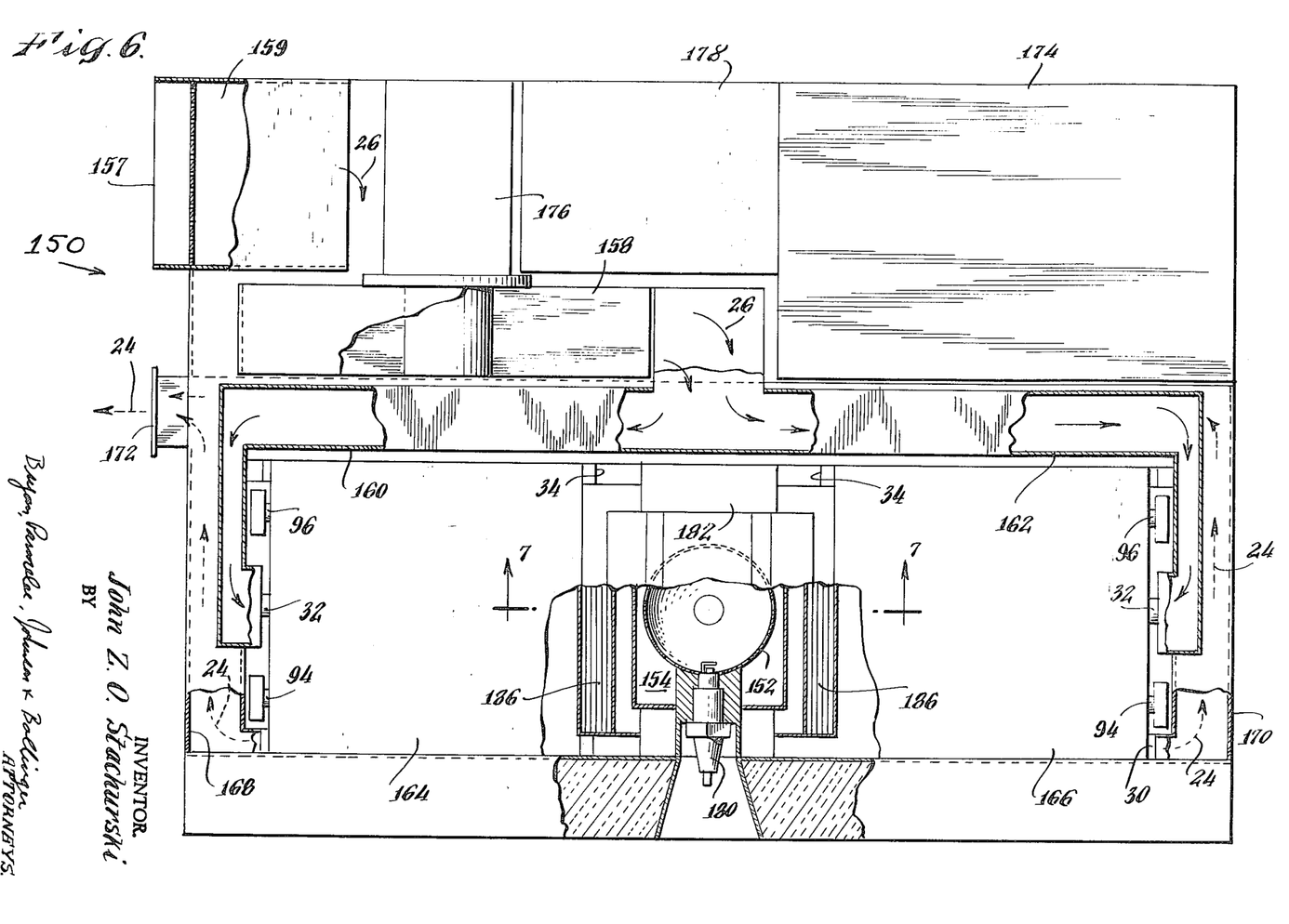
FIG. 6 is a plan view of a self contained thermoelectric generator in accordance with the invention.

The thermoelectric generator 150 is self contained in view of its ability to provide the power to drive its own components. The generator 150 functions by drawing ambient temperature air as a cool fluid through a plurality of thermoelectric generator sections 20 to a burner 152 having a combustion chamber 154. A compressor in the form of a centrifugal turbo blower 158 draws ambient air from an inlet port 157 and an air filter 159. The air is supplied at elevated pressure to ducts 160–162 which direct the air to cool fluid inlet ports 32 located in a pair of stacks 164–166 formed of thermoelectric generator sections 20.

During operation the combustion chamber 154 is effectively closed so that the combustion gases flow back through the thermoelectric generator sections 20 in stacks 164–166 in direct heat exchange relationship with the incoming cooler air. The combustion gases are discharged at outlet ports 30 and returned to ambient through discharge ducts 168–170 from an outlet port 172.

The thermoelectric generator sections 20 are electrically connected in series with suitable cabling (not shown) connected to their output terminals 94–96. The electrical power from the thermoelectric generator is coupled to an inverter 174 which increases the output voltage to a higher DC level for use by external equipment. Alternatively a converter may be used to generate an AC output voltage such as is conventionally available at 60 cycles. A portion of the electrical power from inverter 174 is utilized to drive an electrical motor 176 to power the turbo blower 158.

A small battery 178 is included to provide start up power for motor 176 and power to drive fuel igniter 180 operatively located with burner 152. Battery 178 is electrically recharged by the thermoelectric generator after electrical power therefrom becomes available.

The stacks 164–166 of thermoelectric generator sections 20 are oriented so as to vertically align their outlet ports 34 at the rear of a combustion chamber 154. An air collecting duct 182 is in communication with the ports 34 to direct the air to the bottom of the combustion chamber 154.

The burner 152 may be of conventional design selected to provide an efficient combustion of the fuel and a thorough heating of the gases entering the chamber 154 from the outlet ports 34. The fuel preferably is of the type enabling the use of catalysts 186 in the form of rectangular porous shape and place in front of heated fluid inlet ports 28 (see FIG. 8). The catalysts 186 enable the fuel combustion to take place with pollutants being substantially removed. Alternatively, the catalyst 186 may be dispensed with. In fact, the burning process in the thermoelectric generator of this invention may be carried out at sufficiently high temperatures to assure complete combustion.

Figure 7:
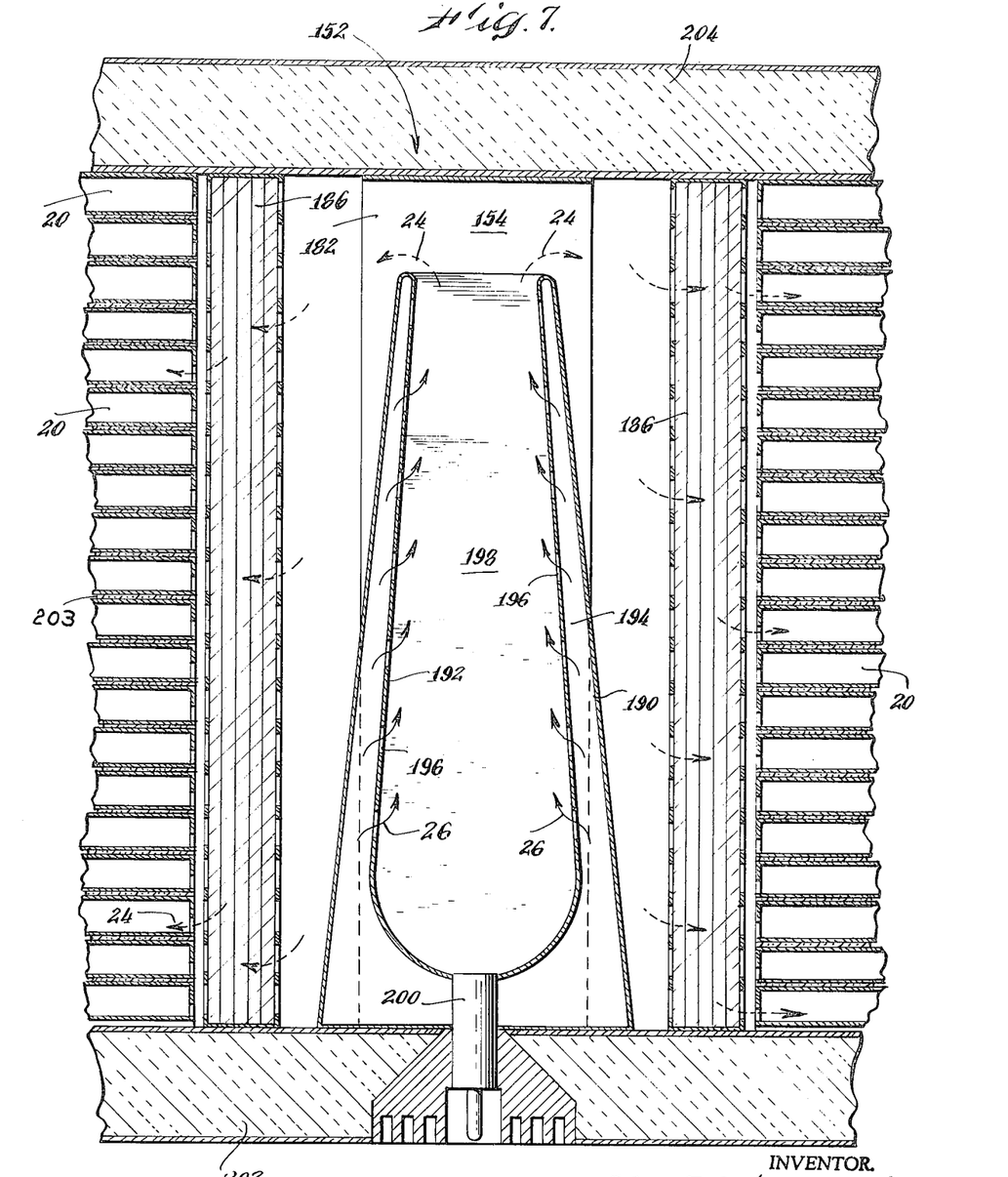
FIG. 7 is a side view in elevation of the burner for use with the thermoelectric generator taken along the line 7—7 in FIG. 6.

FIG. 7 illustrates the burner 152 and burner chamber 154 in further detail. The burner 152 is formed of a converging hollow structure having an outer converging wall 190 and an inner converging wall 192. The walls 190–192 are joined at the top and spaced from one another to form a duct 194. The cool air (actually at substantially elevated temperature) collected by manifold duct 182 from the several cool fluid outlets 34 in thermoelectric generator sections 20 is passed into the bottom end of annular duct 194. The cool fluid 26 is passed through openings such as 196 into the combustion area 198 of the burner. A fuel injector 200 is located at the bottom of the combustion area. Insulator jackets 202–204 are placed around the burner and thermoelectric generator sections 20.

The thermoelectric sections 20 are formed as shown in FIG. 1 with open sides. When the sections 20 are combined as shown in FIG. 7 into a thermoelectric generator, ceramic walls 203 are placed between the sections to electrically insulate the intermediate portions of the sections from one another as well as prevent commingling of the fluid streams in different adjacent generator sections.

In the operation of the thermoelectric generator depicted in FIGS. 6 and 7 the cool air from the several sections 20 feeds the combustion process in the burner 152. The cool air passes in heat exchange relationship with the hot combustion gases and arrives at the combustion chamber at an elevated temperature. This preheating of the air provides a higher burning temperature assuring nearly complete fuel combustion. The hot combustion gases are exhausted to ambient after passing through the several thermoelectric generator sections.

Figures 10, 12:
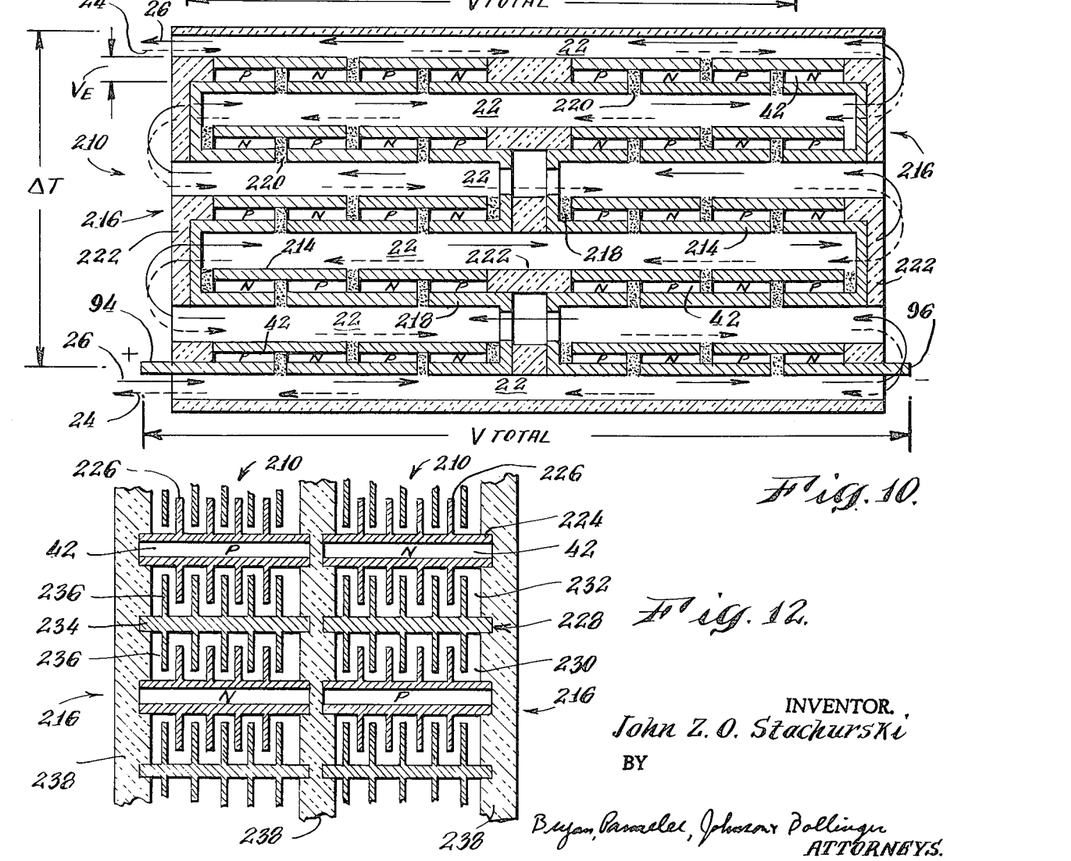
FIG. 10 is a simplified schematic representation of another thermoelectric generator section in accordance with the invention.
FIG. 12 is a partial section view of a thermoelectric generator section in accordance with the schematically illustrated embodiment of FIG. 10.

FIG. 10 schematically illustrates an alternate thermoelectric generator section 210 having thermoelectric elements 42 formed of P and N thermoelectric materials placed adjacent passes 22 of counterflowing direct heat exchanging fluid streams 24–26. The thermoelectric elements 42 are connected in series relationship with P and N materials alternating as illustrated. Electrical connectors such as plates 214 interconnect the elements in each layer 216 with the layers electrically connected in series with end connectors 218 in the form of U shaped brackets. The end connectors are suitably apertured to allow the fluid streams to properly flow along the passes 22.

Thermal and electrical insulators 220 are placed between thermoelectric elements 42 in each layer 216 so that the temperature differences between layers 216 are preserved. Insulators and thermal barriers 222 are provided at ends and in the middle of layers 216.

FIG. 12 illustrates a crossectional view of several thermoelectric generator sections 210 placed adjacent one another. The electrical connectors 214 are shown formed of an element contacting conducting plate 224 carrying laterally spaced fin surfaces such as 226 projecting into the fluid streams. A heat conductor stream separator 228 is located between layers 216 to define at one side a heated fluid stream passage 230 and a cool fluid stream passage 232 on the opposite side. The separator 228 is formed of a thin wall 234 carrying spaced fin surfaces such as 236. Fin surfaces 236 are spaced between fin surfaces 226 and enhance the direct heat exchange between the heated and cool fluid streams 24–26 in each pass. Insulators 238 electrically separate the sections 210 from each other.

The employment of thin fins 226 on the thermoelectric elements 42 assures high heat conductive relationship between the elements even though a direct physical connection as in the embodiment of FIG. 9 is not provided. The fins 236 on the separator wall 228 assure direct efficient heat exchange between the streams.

The schematic representations in FIGS. 9 and 10 illustrate the advantageous structural features of a thermoelectric generator in accordance with the invention. The heated and cool direct heat exchanging fluid streams may be passed through a common passage such as encountered with a periodic heat exchanger. In the embodiment of FIGS. 9 and 10, the separator heat conductive walls 38 and 228 may then be deleted to define a single continuous conduit formed of serially interconnected single passages. This single continuous conduit passes in close heat exchange relationship with and between layers of thermoelectric elements 42. Heated and cool fluid streams are alternately passed from opposite ends of the conduit to produce the desired temperature gradient.

Figures 13, 14, 15:
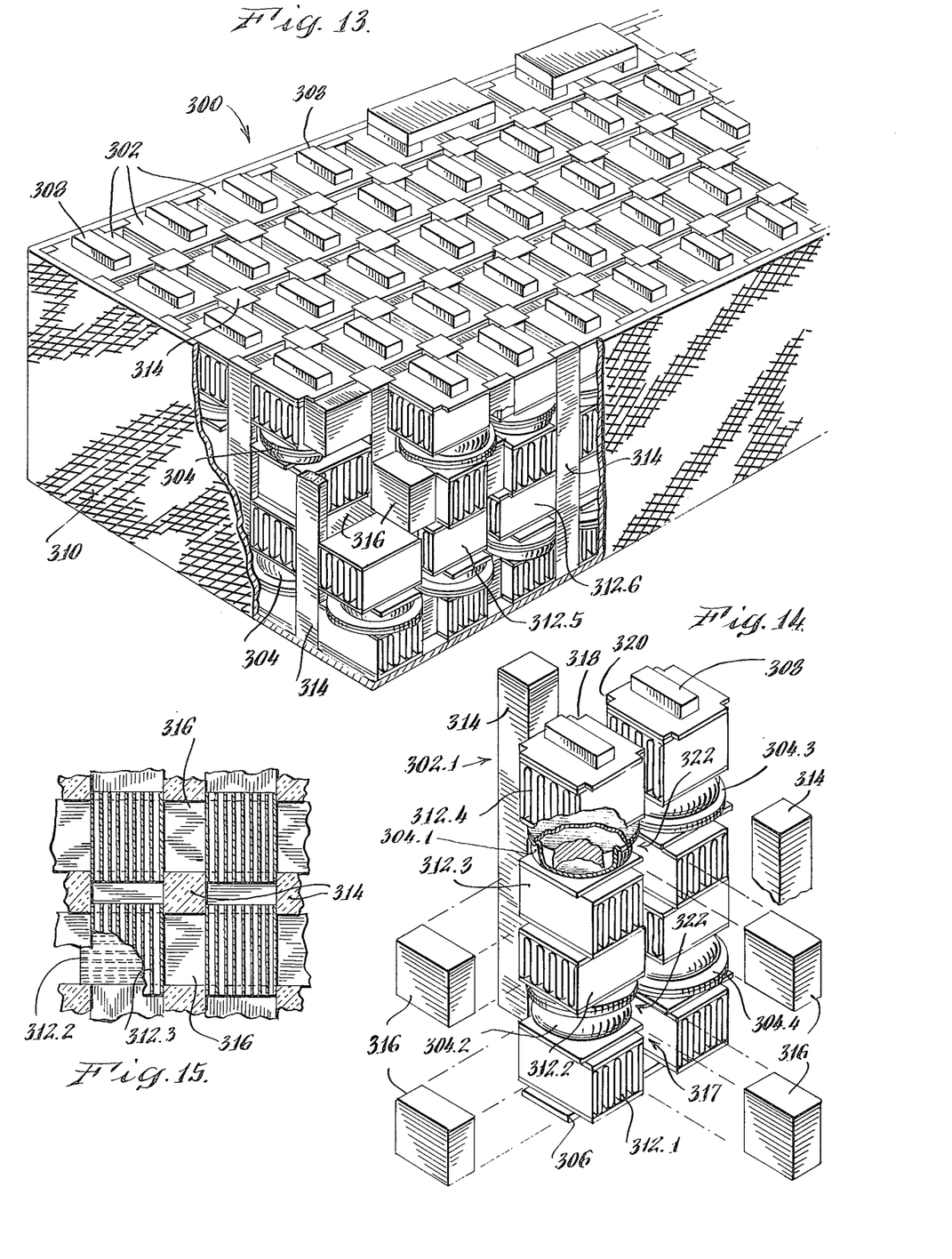
FIG. 13 is a perspective partially broken away view of a thermoelectric generator formed in accordance with the invention.
FIG. 14 is a perspective exploded view of components used in the thermoelectric generator shown in FIG. 13.
FIG. 15 is a partial horizontal section of the thermoelectric generator of FIG. 13.

With reference to FIGS. 13, 14 and 15, a thermoelectric generator 300 is shown formed of a plurality of legs 302 each of which contains a pair of thermoelectric elements 304. Although legs 302 are formed with a pair of elements 304, additional elements could be employed for higher efficiencies.

The legs 302 are arranged in pairs of respectively type n thermoelectric elements 304.1 and 304.2 in leg 302.1 and type p thermoelectric elements 304.3 and 304.4 in adjacent leg 302.2. Each pair of legs of p and n elements is electrically connected in series with a conductor strap 306 brazed to the bottom of the legs. The electrical connection of the leg pairs is obtained with suitable connecting straps (not shown) and brazed to top located bars such as 308.

Legs 302 are placed in a perforated container 310 which is provided with a suitable insulative layer (not shown) below legs 302 and their connecting straps 306.

The legs 302 are of equal height and provided with a bottom located heat exchange element 312.1 (see FIG. 14) receiving a cool fluid stream. A thermoelectric element 304.2 is brazed to the top of heat exchange element 312.1 and to a pair of similar shaped and sized heat exchange elements 312.2 and 312.3 which are in close heat exchange relationship with each other and oriented at 90° for a cross-flow heat exchange of heated and cool fluid streams flowing there-through.

Another thermoelectric element 304.1 is brazed to the top of the pair of heat exchange elements 312.2 and 312.3 and again brazed to the upper heat exchange element 312.4.

The formation of a pair of legs 302 is obtained by mounting the various components as shown in FIG. 14 and then brazing them together in a single brazing operation. The brazing temperature is chosen to avoid damage to any thermoelectric materials.

The legs 302 all are like shaped except that the n and p shaped elements 304 are reversely oriented as shown to help distinguish them during assembly of the thermoelectric generator. To assemble the thermoelectric generator, the pairs of legs are placed to align adjacent heat exchange elements such as 312.5 and 312.6 (see FIG. 13). In this manner coplanar heat exchange elements 312 are aligned to form separate channels for the heated and cool fluid streams.

Since the individual legs 302 are separated from each other, spacers such as 314 and 316 are employed. Spacers 314 are longitudinal rectangular columns formed of a molded insulating refractory material capable of withstanding high temperatures and exhibiting a low heat conductivity. Spacers 314 fit along side legs 302 and fit into recessed corners such as 318, 320 to form longitudinal separation. Spacers such as 316 fit in recesses such as 317 between parallel aligned horizontally adjacent heat exchange elements.

Remaining spaces such as 322 between thermoelectric elements 304.1 and 304.3 (see FIG. 14) are filled with a castable refractory ceramic material that fills the remaining voids.

The resulting structure, including spacers 314, 316 and the glass material defines a multiple of parallel, but separated channels through which the heated and cool fluid streams may flow to provide the conversion of heat to electricity.

A particular advantage of the thermoelectric elements 304 resides in the use of an electrical bypass. The bypass is in the form of an electrically conductive sheath 324 which also serves as part of an encapsulating structure for the thermoelectric materials in elements 304. The crossectional area of the sheath 324 is so selected, together with the resistivity dependent upon the material, to provide a partial shunt of electrical currents. Preferably, the sheath 324 provides a total conductance that is approximately five percent of that of the thermoelectric element 304.

With the electrical bypass 324, the leg 302 continues to conduct current even if the thermoelectric material would fail by becoming a high resistance. In this manner the reliability of the entire thermoelectric generator is substantially improved.

The structure described with reference to the generation of thermoelectricity may be used as a heat pump for cooling by supplying electricity across the generator using the well-known Peltier effect. The use of a heat exchanger with thermoelectric elements selected suitable for operating at cooling temperatures in a structure as taught by this invention provides an efficient cooling or heating device.

In the described embodiments the fluid streams employed for producing a temperature gradient have been described as gaseous. Closed liquid fluid direct heat exchanging streams may be employed with great advantage, especially where nuclear isotopic heat sources are used. Combinations of liquid-gas may be used, for instance where the heat transporting medium is vapor which as it cools condenses to liquid while the cool fluid medium is initially liquid which is boiled to form vapor. A variety of heat exchanging systems may be advantageously employed with a thermoelectric generator of this invention.

Where liquid fuels are used to power a heat source, a gaseous burner utilizing the fuel in vaporized state is advantageously employed. For example, one or several of the thermoelectric generator sections may be specifically employed to receive liquid fuel at its cool inlet port. The liquid fuel is pumped through the cool fluid passages in direct heat exchange relationship with hot combustion gases. The liquid fuel will be efficiently heated to above its vaporizing temperature so as to arrive at the burner in the vaporized easily and fully combustible state. Air mixturing with the vaporized fuel is conveniently carried out at the burner.

The high efficiencies obtainable with a thermoelectric generator of this invention theoretically approaches Carnot Cycle efficiencies. As is well known, such efficiency is determined by the heated fluid inlet and cool fluid outlet temperatures. With such high possible efficiency, large utility power delivering thermoelectric generators utilizing solid or nuclear fuels may be provided.

The electricity may be generated with a thermoelectric generator of this invention virtually free of polluting materials. The heat source may be totally catalytic. A tubular coil carrying vaporized fuel may be imbedded in a catalytic material. Suitably located ports in the coil enable the fuel to enter the material while being entrained by air towards the fuel burning surface of the catalyst.

Alternatively the low pollution capability is achieved with an all flame burner at sufficiently high temperatures to assure substantially complete combustion.

Having thus described several embodiments for thermoelectric generators of high direct conversion efficiencies, variations and modifications thereof remain within the scope of the following claims.

I claim:

1. An efficient method for directly converting heat to electricity from thermoelectric elements arranged in electrical connection to produce electrical power comprising the steps of passing heated and cool fluid streams in overall counterflow direct heat exchange relationship with each other to generate a temperature difference between passes of the direct heat exchanging fluid streams, with said cool fluid stream capturing a substantial portion of the heat energy in the heated fluid stream by heat transfer to the cool fluid stream, exposing opposite sides of said thermoelectric elements in high heat conductive relationship to respective passes of said direct heat exchanging streams to subject the elements to a temperature difference for the efficient production of electrical power from the electrically connected thermoelectric elements.

2. The efficient method of directly converting heat to electricity as claimed in claim 1 and further including the steps of heating said cool fluid stream to which the heat is transferred to a temperature sufficient for its return as a heated cool fluid stream and returning said heated cool fluid stream through the passes in heat exchange relationship with the cool fluid stream.

3. An electric generator wherein electricity is produced by the direct conversion of heat to electricity with thermoelectric elements such as thermocouples and the like comprising a heat exchanger, said heat exchanger including means for passing heated and cool fluid streams in direct heat exchange relationship to each other for highly efficient heat transfer from the heated fluid stream to the cool fluid stream, said heat exchanger being constructed to provide a multiple of said heated and cool fluid stream passes across the heat exchanger to produce a different average temperature for respective passes, resulting in a temperature gradient across the heat exchanger, a multiple of thermoelectric elements of dissimilar materials, said elements being arranged and selectively electrically connected to form electrically interconnected electricity producing couples, said thermoelectric elements being distributed throughout the heat exchanger in high heat conductive relationship with and alongside the heated and cool fluid stream passes, said thermoelectric elements being disposed with a plurality of thermoelectric elements having each one side effectively in high heat conductive relationship with one heated and cool fluid stream pass and maintained at a temperature determined by the direct exchange of heat within said one pass and its other side being effectively in high heat conductive relationship with another different pass of heated and cool fluid streams and maintained at a temperature determined by the direct exchange of heat within said other pass, whereby the opposite sides of said plurality of thermoelectric elements are maintained at different temperatures for an efficient generation of electricity.

4. The thermoelectric generator as claimed in claim 3 wherein the passing means includes a high heat conducting wall located in each pass and interposed between counterflowing heated and cool fluid streams for direct heat exchange between the streams across said high heat conducting wall to recapture the heat energy in said heated fluid stream.

5. The thermoelectric generator as claimed in claim 4 wherein each of said thermoelectric elements in said plurality of elements has one side directly coupled in high heat conducting relationship with the common high heat conducting wall in one pass and the other side, opposite to said one side, directly coupled in high conducting relationship to the high heat conducting wall in another pass.

6. The thermoelectric generator as claimed in claim 5 wherein the high heat conductive wall is electrically isolated from the thermoelectric elements.

7. The thermoelectric generator as claimed in claim 5 wherein the high heat conductive wall is electrically connected to the thermoelectric elements.

8. The thermoelectric generator as claimed in claim 3 wherein each of said heated and cool fluid stream passes are formed of a plurality of heat exchanging elements, each heat exchanging element being arranged to form parallel separated passages sized to enable said heated and cool fluid streams to pass therethrough for heat transfer between them through walls of said heat exchanging elements, said heat exchanging elements in each of said passes being electrically isolated from one another and aligned with each other to form longitudinal adjacent passages through which the heated and cool fluid streams are passed, with said plurality of thermoelectric elements disposed in heat exchanging contact with and between said heat exchanging sections.

9. The thermoelectric generator as claimed in claim 3 wherein said heated and cool fluid stream passes include a plurality of heat exchanging fin sections, each heat exchanging fin section being shaped to define parallel passages sized to respectively enable said heated and cool fluid streams to pass therethrough in overall counterflow direct heat exchange relationship, with said plurality of thermoelectric elements being in high heat conductive relationship with said heated and cool fluid streams.

10. A self contained thermoelectric generator formed of thermoelectric elements to directly convert heat to electricity comprising a housing and a burner having a combustion chamber, said burner mounted to the housing, means for supplying fuel to the burner to produce a high temperature combustion gas in said burner chamber, a heat exchanger having a cool gas inlet port, a cool gas outlet port, a heated gas inlet port and a heated gas outlet port, said heated gas inlet port and said cool gas outlet port being in gas flow communication with the burner chamber, said heat exchanger including means for passing a cool gas stream from the cool gas inlet port and a heated gas stream from the heated gas inlet port in direct heat exchanging relationship to each other for highly efficient overall counterflow heat transfer from the heated gas stream to the cool gas stream, said heat exchanger being constructed to provide a multiple of said direct heat exchanging heated and cool overall counterflow gas stream passes, said multiple passes being coupled to one another to advance the cool gas stream to the cool outlet port at the burner chamber and the heated gas stream to the heat outlet port and produce a different average temperature for respective passes resulting in an overall temperature gradient across the heat exchanger, with said cool gas stream being heated by the heat transfer from the heated gas stream and being further heated in the burner chamber, means for producing said heated and cool gas streams, a multiple of thermoelectric elements of dissimilar materials, said elements being arranged and selectively electrically connected to form electrically interconnected electricity producing couples, said thermoelectric elements being distributed throughout the heat exchanger in high heat conducting relationship with the direct heat exchanging heated and cool overall counterflow gas stream passes, and maintain opposite side of said thermoelectric elements at different temperatures respectively determined by different direct heat exchanging heated and cool overall counterflow gas stream passes for an efficient direct conversion of heat to electricity by the thermoelectric elements with the preservation of the heat energy in the heated fluid stream by heat transfer to the cool fluid stream.

11. The self contained thermoelectric generator as claimed in claim 10 wherein said means for producing said gas streams includes a gas compressor operating to deliver a cool air stream to the burner chamber, said burner chamber being normally closed, with combustion gases being discharged through said heated gas inlet port and through the heat exchanger to the heated gas outlet port.

12. An electricity generator wherein heat is directly converted to electricity with thermoelectric elements comprising a heat exchanger, said heat exchanger including a first pass of direct heat exchanging counterflowing heated and cool fluid streams, a first layer of thermoelectric elements mounted adjacent said first pass with one side thereof in high heat conductive relationship with said first pass, a second pass of direct heat exchanging counterflowing heated and cool fluid streams located alongside the other opposite sides of the thermoelectric elements and in high heat conductive relationship therewith, a second layer of thermoelectric elements located alongside the second pass opposite said first layer of thermoelectric elements and having one side in high heat conductive relationship with said second pass, a third pass of direct heat exchanging counterflowing heated and cool fluid streams located along the other opposite side of thermoelectric elements in said second layer and in high heat conductive relationship with said other opposite sides of thermoelectric elements in said second layer, and means producing additional passes of direct heat exchanging counterflowing heated and cool fluid streams and means producing additional layers of thermoelectric elements having opposite sides in high heat conductive relationship with said passes, means for coupling said first, second, third and additional passes to one another to form a temperature gradient across the heat exchanger with the heat energy in the heated fluid stream being recaptured by the cool fluid stream and said respective passes at different average temperatures to expose thermoelectric element in respective layers to temperature differentials, and means for electrically interconnecting said thermoelectric elements to produce a thermoelectric generator voltage 13. The electricity generator as claimed in claim 12 wherein said first, second, third and additional passes of direct heat exchanging heated and cool fluid streams are provided with a separating wall located to define separated heat and cool fluid passages, said wall being formed of high heat conductive material to provide an efficient exchange of heat between the heated and cool fluid streams in said passes.

14. The electricity generator as claimed in claim 13 wherein said thermoelectric elements in selective ones of said layers are electrically isolated from one another and with said wall being formed of a high electrically conductive material and sized to electrically contact opposite thermoelectric elements in opposing layers to form thermoelectric elements which are electrically connected in series with one another along the thermal gradient.

15. The electricity generator as claimed in claim 12 wherein said thermoelectric elements in said layers have opposing sides provided with heat exchange fins protruding in high heat conductive relationship into respectively adjacent passes for efficient maintenance of temperature differentials across said thermoelectric elements.

16. The electricity generator as claimed in claim 15 wherein said first, second, third and additional passes are provided with a separating wall located to define separated heated and cool fluid passages, said wall being formed of a high heat conductive material to provide an efficient exchange of heat between the counterflowing heated and cool fluid streams in said passes, said wall being electrically isolated from opposing thermoelectric elements and provided with heat exchange fins protruding into adjacent heated and cool fluid passages.

17. A self contained electricity generator wherein electricity is produced by the direct conversion of heat to electricity with thermoelectric elements comprising heat to electricity with thermoelectric elements comprising
   means producing a source of heat,
   a heat exchanger having a plurality of fluid passages in direct heat exchanging relationship to produce a temperature gradient across the heat exchanger,
   means for passing a cool fluid through selected ones of said fluid passages to the heat producing means for heating thereby and return the heated fluid through selected others of said fluid passages in counterflow relationship with the cool fluid for direct heat exchange between said heated and cool fluids and produce said temperature gradient across the heat exchanger with said counterflowing heated and cool fluid streams forming a multiple of passes at different average temperatures throughout the heat exchanger,
   a plurality of thermoelectric elements distributed throughout said heat exchanger and formed of dissimilar materials, said thermoelectric elements being selectively electrically connected to form electricity producing couples with a multiple of said thermoelectric elements having opposite sides in high heat conducting relationship with direct heat exchanging heated and cool fluids in said passes maintained at respectively different temperatures for an efficient generation of electricity from said thermoelectric elements by the efficient recapturing of heat energy in the heated fluid with said cool fluid.

18. An electricity generator wherein heat is directly converted to electricity with thermoelectric elements comprising
   a heat exchanger, said heat exchanger being formed of a single continuous conduit arranged to form a multiple of direct heat exchanging fluid stream passes between opposite ends of the conduit to produce a temperature difference across the heat exchanger produced by heated and cool fluid streams alternately passed through the conduit from respectively opposite ends of the conduit, and
   thermoelectric elements of dissimilar materials, said elements being arranged and selectively electrically coupled to form electrically interconnected electricity producing couples,
   said thermoelectric elements being distributed throughout the heat exchanger in high heat conductive relationship with and alongside the single continuous conduit, with one side of thermoelectric elements in high heat conductive relationship with one pass of said single continuous conduit and maintained at a temperature determined by the direct exchange of heat within said one pass, and with the other side of said thermoelectric elements in high heat conductive relationship with another pass of said single continuous conduit and maintained at a temperature determined by the direct exchange of heat within said other pass,
   whereby opposite sides of said thermoelectric elements are maintained at different temperatures for an efficient generation of electricity.

19. In an electricity generator wherein heat is directly converted to electricity with thermoelectric elements, the improvement comprising
   heat exchange elements formed of corrugated segments which define passages for heated and cool fluid streams, said corrugated segments being formed of high heat conductive and low electrically resistant material, said corrugated segments further being connected in pairs with a pair located in both electrical and heat conductive relationship with and between successively located thermoelectric elements to form temperature differentials across the thermoelectric elements and provide electrical interconnection of the thermoelectric elements for a high conversion efficiency of the thermoelectric generator.

20. In an electric generator wherein electricity is produced by the direct conversion of heat to electricity with thermoelectric elements such as thermocouples and the like, comprising
   a plurality of thermoelectric legs formed of thermoelectric elements and heat exchange elements, with at least a pair of thermoelectric elements in each leg being separated by a pair of heat exchange elements in high heat conductive and heat exchange relationship, said heat exchange elements being arranged to conduct separate streams of respectively heated and cool fluid streams, said pair of heat exchange elements being electrically conductive to form an electrically conductive thermoelectric leg;
   said plurality of thermoelectric legs being arranged to align corresponding heat exchange elements with each other to form a thermoelectric generator in the form of a heat exchanger interspersed with thermoelectric elements.

21. The thermoelectric generator as claimed in claim 20 wherein said thermoelectric elements are encapsulated in an electrically conductive material having a conductance selected lower than the encapsulated thermoelectric material to provide continued electrical conduction of the thermoelectric leg upon failure of a thermoelectric element therein for enhanced reliability of the thermoelectric generator.

22. The thermoelectric generator as claimed in claim 21 wherein the electrically conductive material has a conductance of the order of about five percent of the conductance of the thermoelectric material encapsulated thereby.

23. A thermoelectric element for use in a thermoelectric generator and
an electrically conductive sheath coupled in electrical parallel relationship with the thermoelectric material to form an electrically conductive bypass for enhanced reliability of the thermoelectric element.

24. The improved thermoelectric element as claimed in claim 23 wherein the sheath provides encapsulation of the thermoelectrical material.

25. The improved thermoelectric element as claimed in claim 23 wherein the electrically bypassing sheath has a conductance which is lower than that of the thermoelectric material and is sufficiently high to carry bypassing electrical currents upon failure of the thermoelectric material.

26. An electric generator wherein electricity is produced by the direct conversion of heat to electricity with thermoelectric elements such as thermocouples and the like comprising
a multiple of thermoelectric elements of dissimilar materials, said elements being arranged and selectively electrically connected to form electrically interconnected electricity producing couples;
a heat exchanger, said exchanger including means for forming a pass of heated and cool fluid streams in direct heat exchange relationship with each other for an efficient heat transfer from the heated fluid stream to the cool fluid stream;
said thermoelectric elements being distributed throughout the heat exchanger in layers separated by said pass of heat exchanging heated and cool fluid streams, with said layers of thermoelectric elements having one side in heat conducting relationship with said pass to maintain said one side at a temperature determined by the heat exchange within the pass, with the other side of said layers being respectively in heat conducting relationship with a heated and cool fluid stream for establishing a temperature difference across said layers of thermoelectric elements for the generation of electricity.

27. A thermoelectric heat pump utilizing the Peltier effect comprising
a multiple of thermoelectric elements of dissimilar materials, said elements being arranged and selectively electrically connected to form thermocouples;
a heat exchanger, said heat exchanger including means for passing hot and cool fluid streams in direct heat exchange relationship to each other for an efficient heat transfer from the hot fluid stream to the cool fluid stream, said thermoelectric elements being distributed in separated layers throughout the heat exchanger with the heat exchanger constructed to locate a pass of heat exchanging hot and cool fluid streams between consecutive layers of thermoelectric elements, said pass of heat exchanging fluid streams being in heat conducting relationship with said respective layers of thermoelectric elements for an efficient conversion of electricity.

* * * * *